Figure 1:
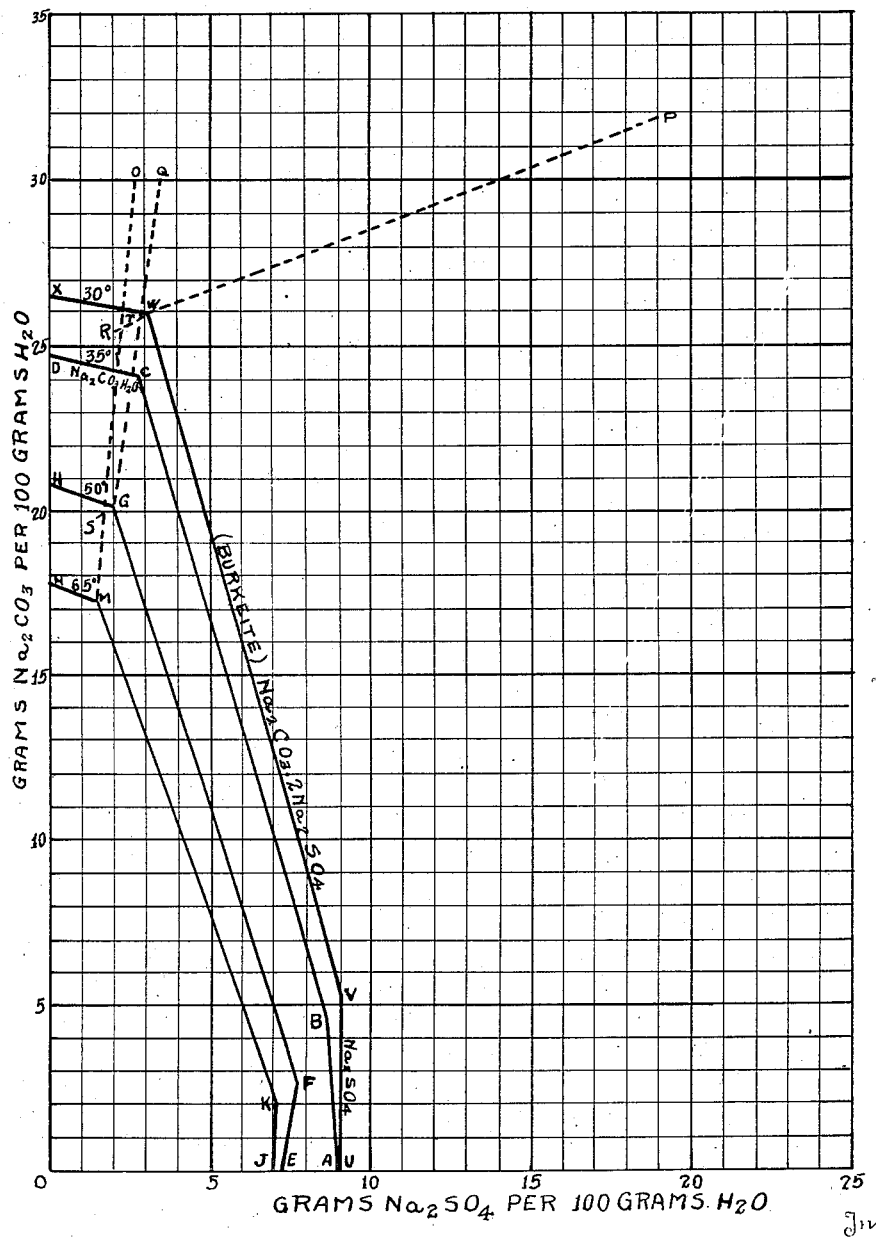

Patented May 2, 1944

2,348,164

UNITED STATES PATENT OFFICE 2,348,164

PROCESS OF PREPARING SOLUTIONS CONTAINING HIGH RATIOS OF SODIUM CARBONATE TO SODIUM SULPHATE

Leroy G. Black, Elliott Bryant Fitch, and Henry Bruno Suhr, Trona, Calif., assignors to American Potash & Chemical Corporation, Trona, Calif., a corporation of Delaware Application November 4, 1939, Serial No. 302,904

6 Claims. (Cl. 23—296)

This invention relates to a method of preparing solutions containing high ratios of sodium carbonate to sodium sulphate.

Solutions produced by the process of the present invention are useful in the recovery of sodium carbonate from solutions containing sodium sulphate. Complexes containing sodium sulphate, sodium carbonate, and sodium chloride may be processed for the preparation of soda ash and sodium sulphate by the process described in United States Patent No. 1,836,426. By the process of that patent solutions containing sodium carbonate and sodium sulphate having a greater ratio of carbonate to sulphate than exists in burkeite are prepared to profitably recover sodium carbonate for the production of soda ash from such solutions, and it is desired to treat such solutions to increase their ratio of carbonate to sulphate.

The process of the present invention is directed to providing an improved method of forming solutions having a high ratio of carbonate to sulphate and may be with advantage substituted for certain steps described in said Patent No. 1,836,426, or used for any other desired purpose.

Sodium carbonate may be recovered from solutions containing an appreciable concentration of sodium sulphate and having a ratio of sodium carbonate to sodium sulphate greater than exists in the double salt burkeite by a cooling process which is preceded by steps which are designed to increase the carbonate to sulphate ratio of the solution, primarily through lowering of the sulphate concentration. This is brought about by precipitating burkeite, a double salt of sodium sulphate and sodium carbonate

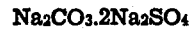
($Na_2CO_3.2Na_2SO_4$)

containing more sulphate than carbonate. Although the carbonate concentration is also lowered by removal of burkeite, the greater extraction of sulphate leaves a solution, termed "hot carbonate liquor," from which sal soda can be crystallized by cooling. In the prior patent, burkeite is precipitated by adding sodium chloride and heating to a temperature within the burkeite field, whereupon burkeite precipitates, leaving hot carbonate liquor. Maximum recovery of sal soda from the hot carbonate liquor obtains when the sodium carbonate concentration of the hot solution is high and the sodium sulphate concentration is a minimum, as upon cooling, the solution eventually reaches saturation with a sulphate solid phase, usually Glauber salt ($Na_2SO_4.10H_2O$). Thus, it is desirable to remove as little sodium carbonate as possible from the hot liquor, while depressing the sodium sulphate concentration. It is an object of our invention to improve this method of preparing hot carbonate solutions so as to further reduce the sodium sulphate concentration without at the same time greatly reducing the sodium carbonate concentration.

Other objects, features, and advantages of the invention will appear from the following description of a preferred form of a process embodying features of the invention. This description will be given in connection with the figures of the drawings of which Figure 1 is a plot of the 30°, 35°, 50°, and 65° C. isotherms of the system

$Na_2SO_4$—$Na_2CO_3$—$H_2O$ saturated with sodium chloride, together with portions (broken lines) of the curves at 50° C. and 65° C., representing the monovariant solutions saturated with $Na_2CO_3.H_2O$ and

Figure 2:
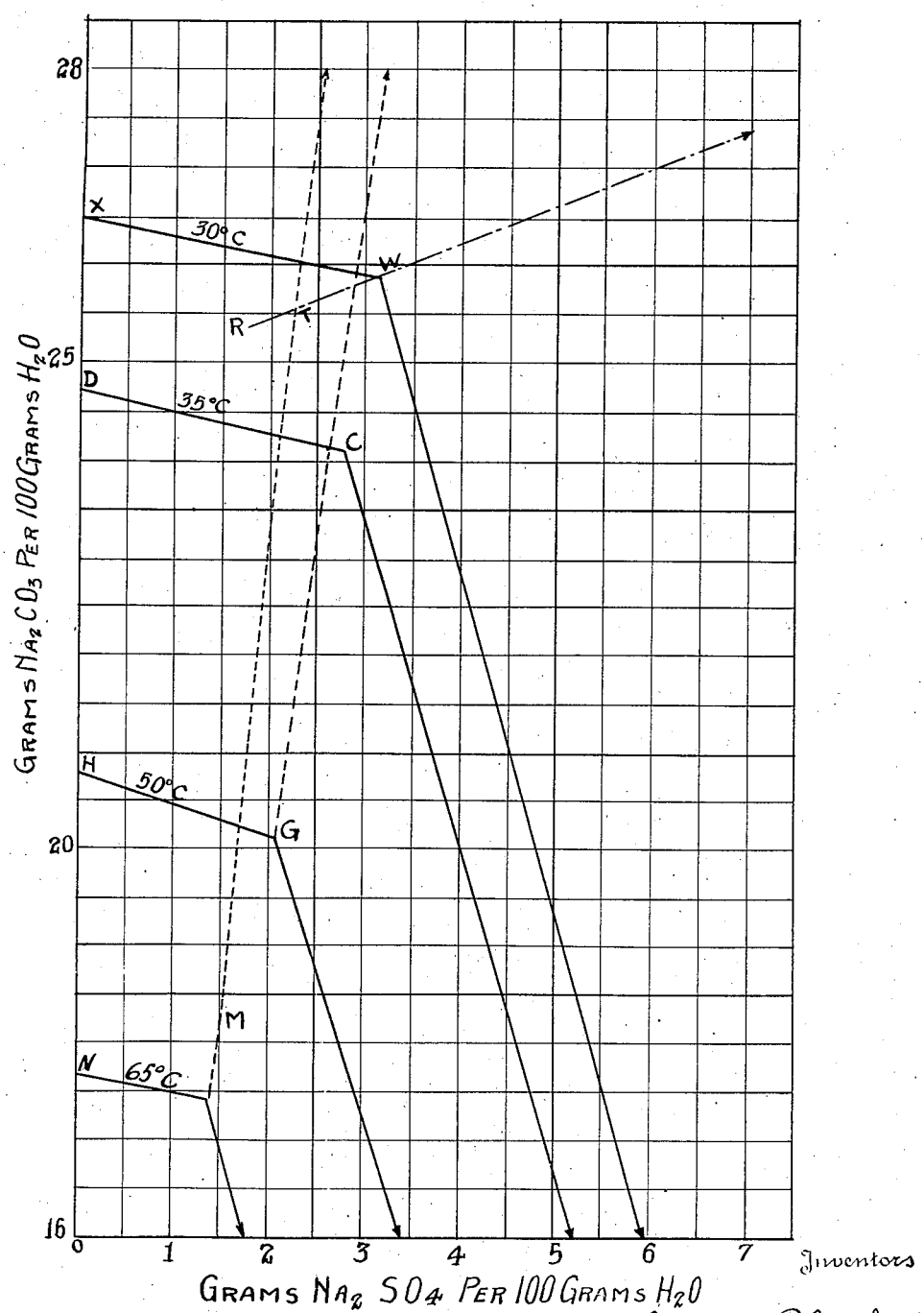

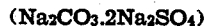
$Na_2CO_3.2Na_2SO_4$ and undersaturated with NaCl and Figure 2 is an enlargement of the upper portion of the plot of Figure 1.

In Figure 1 of the drawings, the curves U—V—W—X, A—B—C—D, E—F—G—H, and J—K—M—N represent, respectively, the isotherms at 30° C., 35° C., 50° C., and 65° C., for the system sodium sulphate, sodium carbonate and water, saturated with sodium chloride; these curves plot the compositions of all solutions saturated with NaCl and $Na_2CO_3$ or $Na_2SO_4$, or burkeite at the several temperatures. Each branch of the curves represents solutions saturated with NaCl and one other solid phase (as marked), and a break-point in the curve represents the composition of the solution saturated with NaCl and the two solid phases of the adjacent branches.

Thus, the lines UV, AB, EF, and JK denote the compositions of all solutions saturated with sodium chloride and anhydrous sodium sulphate, at the several temperatures, while the points V, B, F, and K are the compositions of solutions saturated with sodium chloride, anhydrous sodium sulphate and the anhydrous double salt, burkeite, $Na_2CO_3.2Na_2SO_4$.

Also plotted, are portions G—Q and M—O of the curves showing the change in compositions of the invariant points at 50° C. and 65° C., saturated with $Na_2CO_3.H_2O$ and burkeite, at concentrations of sodium chloride less than saturation therewith. Curves G—Q and M—O represent the change in composition of the invariant points G and M as the chloride concentration decreases from saturation. Sodium carbonate and sodium sulphate concentrations can be read directly therefrom (but the NaCl concentrations can not). Such sodium chloride concentrations are set forth in the following table which shows also the $Na_2CO_3$ and $Na_2SO_4$ at the same points. Other values for NaCl can be interpolated from the data given in the table.

| Point | Composition (grams/100 grams $H_2O$) | | |
|---|---|---|---|
| | NaCl | $Na_2CO_3$ | $Na_2SO_4$ |
| G | 26.4 | 20.2 | 2.0 |
| 1 | 22.9 | 23.0 | 2.3 |
| 2 | 18.0 | 27.3 | 2.9 |
| Q | 14.8 | 30.2 | 3.4 |
| M | 28.3 | 17.4 | 1.47 |
| 3 | 22.6 | 22.0 | 1.8 |
| 4 | 18.2 | 26.0 | 2.2 |
| 0 | 13.5 | 30.0 | 2.86 |

The several features of the present invention have been devised especially for use with other steps of the comprehensive process covered in U. S. Patent No. 1,836,426 and are applicable to the wide variety of salts and salt mixtures set forth in that patent. Likewise, the steps of our invention can be used apart from the specific steps which make up the complete process of recovering both sodium sulphate and sodium carbonate which forms the basis of the prior patent.

Our process applies to the treatment of any solution containing a greater ratio of sodium carbonate to sodium sulphate than exists in burkeite, and to any solid complexes or mixtures which will provide a solution of like composition. Such solutions may be formed solely by dissolution of solids or may arise as liquors derived from natural sources or from other processes or sequence of steps. Of this latter class is a liquor produced in the complete process of the previous patent, which is termed "cold sulphate liquor." This liquor, obtained through the treatment of complexes and mixtures containing more sulphate than carbonate, has a ratio of carbonate to sulphate which is considerably greater than that of burkeite. Furthermore, such cold sulphate liquor may be further enriched with respect to its sodium carbonate content by any one of several means, one of which includes the dissolving thereinto of sodium carbonate monohydrate from some convenient source. Although any solutions or solids having ratios of carbonate to sulphate greater than burkeite may be useful raw materials for the present process, it is essential that such solutions, or solutions of such solids, not having a sufficiently high percentage of sodium carbonate to become at least saturated therewith, when heated and saturated with sodium chloride, be first carried through the Glauber salt crystallization manipulation steps of the prior process (Allen et al., No. 1,836,426) to raise their quality to that specification.

In the process of the earlier patent hot carbonate liquor is produced from cold sulphate liquor or other suitable solutions by saturating the solution with sodium chloride and heating to a temperature within the burkeite field, the order in which the heating and sodium chloride addition are effected not being considered important by that patent so long as the final hot solution is saturated with chloride. Usually, the temperature was chosen to be within the burkeite field, but it was recognized that higher temperatures would give lower sulphate concentrations. High temperatures, while bringing about the very necessary reduction of sulphate, caused the precipitation of sodium carbonate monohydrate ($Na_2CO_3.H_2O$). While such precipitation was undesirable (in that removal of $Na_2CO_3.H_2O$ from the solution at this point represents a loss) provision was made for returning the $Na_2CO_3.H_2O$ so precipitated to the process, though at a loss in efficiency, when the higher temperatures were a requisite condition of operation. By the improved process of our invention, we are enabled to reduce the sulphate satisfactorily, while at the same time maintaining the sodium carbonate monohydrate in solution, in that way avoiding the loss in efficiency.

The process of the past is diagrammatically illustrated in Figure 1 and in Figure 2. Supposing that there is available a solution of composition P produced, by one or more manipulative steps, from cold sulphate liquor. The solution P was so chosen, for illustration, that it would just reach saturation with burkeite and carbonate monohydrate at 30° C. when fully saturated with NaCl. Upon addition of NaCl and heating to 30° C., the burkeite is precipitated and the composition of solution P proceeds along the line P to W, where it is saturated with two solid phases, $Na_2CO_3.H_2O$ and $Na_2CO_3.2Na_2SO_4$ as well as NaCl. This procedure constitutes the normal or preferred process. Further addition of NaCl and heating, to say 50° C., precipitates additional burkeite (reduces the sulphate), but also precipitates a crop of $Na_2CO_3.H_2O$; the liquor composition changes to that at point G, whose composition is shown in the table above. The carbonate so precipitated was, in past practice, filtered off and returned to the system. This maneuver occasions a loss in efficiency and was more in the nature of an optional method used when imperative to reduce the sulphate concentration farther.

The small decrease in sodium sulphate concentration (about 1.0 grams $Na_2SO_4$ per 100 grams $H_2O$) obtained in this way might not appear to warrant extra heating or the trouble necessary to re-treat the precipitated monohydrate. It must be appreciated, however, that changes in the sulphate concentration in the hot carbonate liquor are magnified upon cooling and that even very small sulphate reductions during this step of the process represent worthwhile gains in the subsequent cooling step. Not only is the increase in carbonate recovered as sal soda greater, but also of positive value are the lower concentrations of both sulphate and carbonate which remain in the final cold sal-soda and liquor. When this liquor is discarded, as is often the case, its composition and volume determine the efficiency of the overall process; consequently, smaller volumes and lower concentrations in the cold end liquor are distinctly beneficial.

The process of our invention embraces improvements in the method of precipitating burkeite whereby high temperatures may be used and greater quantities of that double salt can be precipitated from solutions high in carbonate, thereby lowering the sulphate concentration without at the same time precipitating a free carbonate solid phase. These improvements are the result of the discovery of two interdependent effects or principles affecting the precipitation of burkeite and sodium carbonate monohydrate from solutions of sodium carbonate and sodium sulphate which tend to precipitate sodium carbonate monohydrate as well as burkeite at higher temperatures. As appears from the drawings, any solution of sodium carbonate and sodium sulphate capable of precipitating sodium carbonate monohydrate at temperatures of 65° C. or lower contains at least 17 grams of sodium carbonate per 100 grams of water. Such solutions are also characterized by the fact that they contain a greater ratio of sodium carbonate to sodium sulphate than that of burkeite. The first of these conditions or principles relates to the effect of sodium chloride on the fixed temperature monovariant point saturated with sodium carbonate monohydrate and burkeite. We have found that solutions which are somewhat unsaturated with sodium chloride at said monovariant point will retain very little more sodium sulphate than said solution saturated with sodium chloride, but that the chloride unsaturated solution has the power of holding in solution a considerably greater quantity of sodium carbonate (in the form of sodium carbonate monohydrate). As a result, we are enabled to operate the burkeite precipitation step at higher temperatures than heretofore and to accordingly reduce the sulphate concentration while largely retaining the carbonate values in solution.

The first of these conditions, briefly outlined above, concerns operation as referred to stable equilibrium values. We have also found that a considerable improvement can be obtained in conjunction with unsaturation with sodium chloride, if desired, by operating supersaturated with sodium carbonate monohydrate, i. e., by maintaining a metastable rather than a stable condition. When we speak of a supersaturated solution we mean a solution that contains an excess of dissolved substance over the amount normally required for saturation at a particular temperature, but which still holds it all in solution. In effect, the discovery is that sodium carbonate monohydrate supersaturates to a considerable extent and that such supersaturation within an appreciable range is stable enough to permit operation on an industrial scale within the field of monohydrate supersaturation. Operating with the monohydrate supersaturated means that somewhat greater quantities of sodium chloride, still below saturation therewith but sufficient to precipitate some sodium carbonate monohydrate under normal or stable equilibrium conditions, can be used. As a consequence, further burkeite is precipitated, thus additionally lowering the sulphate concentration, but under proper conditions of operation the sodium carbonate monohydrate which would normally be precipitated is retained in the solution in a state of supersaturation and the carbonate to sulphate ratio of the solution further raised.

Otherwise stated, by our improved process concentrated solutions of sodium carbonate and sodium sulphate having a ratio of carbonate to sulphate greater than that of burkeite are converted into excellent hot carbonate liquors without precipitating a free sodium carbonate solid phase, but while largely retaining the aforesaid desirable effect of high temperature upon the sulphate concentration. This we accomplish, in part, by maintaining the concentration of sodium chloride somewhat under saturation, a principle heretofore not recognized or appreciated. As the concentration of sodium chloride decreases gradually from saturation therewith (at a given temperature, along the lines G—Q, M—O, etc.), the sodium carbonate concentration of the monovariant point increases greatly while the corresponding increase in the sulphate concentration is quite small. Instead of by fully saturating the solution (e. g., cold sulphate liquor or a derivative thereof) with sodium chloride, we prefer to bring the composition of said cold liquor to approximately the monovariant point saturated with respect to carbonate monohydrate and burkeite (but unsaturated with respect to NaCl at the fixed high temperature) by direct or straight line precipitation of burkeite through application of heat and a limited quantity of sodium chloride.

The behavior of this system and the advantages we are able to take thereof will be more readily appreciated in connection with lines M—O and G—Q of the diagram, which define the composition of the fixed temperature monovariant points saturated with sodium carbonate monohydrate and burkeite at NaCl concentrations below saturation. It is clearly evident that sodium chloride has a marked effect on the $Na_2CO_3$ concentrations along said lines G—Q, M—O, etc., and but little effect on the $Na_2SO_4$ concentrations. For example, the monovariant solution O at 65° C. (about 15 grams per 100 grams $H_2O$ undersaturated with NaCl) will hold almost 13 grams per 100 grams $H_2O$ more $Na_2CO_3$, but only 1.39 grams per 100 grams $H_2O$ more $Na_2SO_4$ than solution M saturated with NaCl at the same temperature.

As illustrative of our improved process, instead of heating the aforesaid solution P to 50° C. and adding sufficient NaCl to saturate it at said temperature (26.4 grams NaCl per 100 grams $H_2O$), we weigh out a limited quantity of NaCl so chosen that the final solution will contain but 18.7 grams NaCl per 100 grams $H_2O$ (determinable from Figure 1 and the foregoing table), add it to solution P, and heat the solution to an even higher temperature, namely 65° C. In the example being used (purely for illustration) this 65° C. solution will correspond approximately with point T. It is unsaturated by about 9.6 grams NaCl per 100 grams $H_2O$. Its $Na_2SO_4$ content is within 0.2 gram per 100 grams $H_2O$ of the hot carbonate liquor of past practice, point G; but its $Na_2CO_3$ content is much higher, being 5.5 grams $Na_2CO_3$ per 100 grams $H_2O$ higher than the point G liquor of prior practice. This is a very desirable and valuable increase of $Na_2CO_3$ content in the hot carbonate liquor.

As has already been noted, increasing the temperature and the sodium chloride concentration both decrease the sodium sulphate concentration. In practice, these two factors are adjusted so that jointly they effect the desired reduction in the sodium sulphate concentration, the chloride concentration, i. e., the degree of unsaturation therewith usually being dependent upon the temperature which is best suited to the particular circumstances of the operation. We prefer temperatures as high as expedient, but usually not greater than about 90° C., as higher temperatures require special precautions and special equipment.

The cold sulphate liquor, or any concentrated solution of carbonate and sulphate having a ratio of carbonate to sulphate greater than burkeite, is first supplied with a quantity of sodium chloride at a temperature within the burkeite field. As may be seen from the foregoing table, both carbonate and sulphate have invert solubility characteristics while sodium chloride solubility increases with increase in temperature. In this improved process, we prefer to add the requisite NaCl prior to heating to the final high temperature. Preferably, the temperature of the solution during the addition of sodium chloride is held low, and, if possible, close to that at which saturation with sodium chloride will produce the chloride concentration wanted at the higher final temperature. When this is feasible, close control of the amount of solid chloride supplied to the cold starting solution is then unnecessary, excess sodium chloride being added and then removed as by filtration, settling, or the like, after saturation has been reached. This method is generally more practicable in connection with the procedure next described.

There is available another maneuver by which still lower sulphate concentrations can be secured in the hot carbonate liquor. Up to this point, consideration has been given only to the effect of chloride and temperature at equilibrium conditions. We have found that we can supersaturate the hot carbonate liquor with respect to sodium carbonate monohydrate and can utilize this supersaturation characteristic to obtain a further lowering of the sulphate to carbonate ratio of the solution and to thereby further increase the potential yield of sal soda. We accomplish this further small (but important) reduction of sulphate paradoxically by the judicious addition of more sodium chloride to the chloride-unsaturated liquor just described and exemplified by composition T. Such addition of sodium chloride, if equilibrium conditions were attained would precipitate burkeite and $Na_2CO_3.H_2O$ along the line TM, but by maintaining the solution supersaturated with $Na_2CO_3.H_2O$ precipitates only burkeite along the line TR. The result is then only a lowering of the sulphate concentration (with a small removal of carbonate as burkeite) but no major loss of carbonate values.

We have found that sodium carbonate monohydrate exhibits a tendency to supersaturate and the "metastable" field of supersaturation is of sufficient area, under conditions of careful commercial operation, to permit the handling of such solutions without releasing the monohydrate supersaturation. The permissible degree of supersaturation which is intimately connected with the temperature and chloride concentration of the hot carbonate liquor, will vary with the particular equipment used, the amount of agitation, the presence or absence of seeds of the monohydrate, and other factors which affect supersaturation and may have to be determined empirically in certain cases. We have found that at a fixed temperature a supersaturation of the monohydrate, amounting to from 5–7 grams of $Na_2CO_3$ per 100 grams of $H_2O$ above the stable equilibrium monovariant point saturated with the two solid phases, burkeite and $Na_2CO_3.H_2O$, at that temperature, can be duplicated and maintained on a plant scale. While operating so supersaturated liquors are caused to hold in a state of dynamic equilibrium a quantity of sodium carbonate much greater than heretofore thought possible, while burkeite is caused to continue to precipitate. To avoid releasing the monohydrate supersaturation during the burkeite precipitation the system should be kept essentially free from seeds of monohydrate, the retention time should be kept short, and the system should not be subjected to undue mechanical shock or stimuli factors which tend to reduce the area of the metastable field of supersaturation.

To further illustrate this phase of the invention, again consider the monovariant solution T (at 65° C.) saturated with burkeite and sodium carbonate monohydrate, but 9.6 grams (per 100 grams $H_2O$) unsaturated with respect to NaCl at said temperature. In converting the original "cold sulphate liquor," P, into this improved hot carbonate liquor of the present invention, the overall composition change brought about by the limited addition of NaCl and by heating to 65° C. is shown by line PT. The slope of this precipitation line is that of the ratio

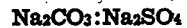

$Na_2CO_3:Na_2SO_4$ in burkeite, as burkeite is the only salt which precipitates during the process. The hot (65° C.) solution T contains about 18.7 grams NaCl per 100 grams $H_2O$, while saturation at 65° C. would require the presence of 28.3 grams NaCl/100. As previously noted, the liquor of composition T contains about 2.2 grams $Na_2SO_4$ per 100 grams $H_2O$.

This sulphate is further reduced, without at the same time reducing the carbonate content materially, by the addition of a little more NaCl; enough in this example to bring the NaCl concentration up to about 25.4 grams per 100 grams of $H_2O$. Under normal or equilibrium conditions, this additional chloride would cause the composition of the solution to proceed downward from T along the line OM, precipitating sodium carbonate monohydrate. The quantity of NaCl specified would, however, not bring the solution to the invariant point M, but the resulting solution would have a composition under equilibrium conditions approximating point S on line OM.

But, as stated above, this feature of our invention does not deal with equilibrium conditions. On the contrary, we conduct this manipulation in such a way as to establish a metastable system, one wherein no precipitation of sodium carbonate monohydrate occurs. Under such conditions, the introduction of this small additional quantity of NaCl causes only a precipitation of a further quantity of burkeite, along the burkeite precipitation line to R as already described. The final metastable solution will thereupon assume a composition at 65° C., represented by point R of Figure 1. Point R may be said to be supersaturated by about 5.5 grams $Na_2CO_3$, as compared with the equilibrium point S. This final precipitation of burkeite has now served to depress the $Na_2SO_4$ content to about 1.7 grams per 100 grams $H_2O$.

The value of these features of the present invention may be more fully comprehended if we now compare the metastable solution R with the prior art hot carbonate liquor G. Liquor R has less sulphate and a vastly greater $Na_2CO_3$ content than said prior art equilibrium liquor G. While it is true that prior art liquor G could have been reduced to an equal sulphate content (by further heating and addition of NaCl), such procedure would have placed such prior art liquor at an even greater disadvantage, due to further reduction of its carbonate monohydrate content.

During the deposition of burkeite, supersaturation therewith also tends to occur. This must not be allowed to take place to any marked extent if the trick of holding supersaturated sodium carbonate monohydrate in solution is to be successful. Since burkeite contains sodium carbonate, supersaturation therewith raises the sodium carbonate concentration of the solution, and if said supersaturation is allowed to build up it would tend to cause release of carbonate monohydrate supersaturation. We prevent supersaturation with respect to burkeite by maintaining in the system a considerable volume of burkeite seed. Such seed may be generated during the first stage of burkeite precipitation, before supersaturation with respect to sodium carbonate monohydrate has been effected. Supersaturation is prevented by providing reaction time, and by providing means for maintaining the burkeite seed in intimate contact with the solution. Use of these latter expediencies must, of course, be compromised with the factor of establishing and maintaining the desired supersaturation with respect to sodium carbonate monohydrate. Too long a holding time, or too violent an agitation would destroy the monohydrate supersaturation.

In addition to these general or usual factors which would tend to destroy monohydrate supersaturation, we have found it necessary to recognize certain additional factors requisite to the successful commercial operation of this process. Such factors include the rate of increase of temperature and rate of change in sodium chloride concentration. Addition of the chloride at a relatively low temperature has been found a desirable procedure, and the rate of change of temperature should not be too precipitous. Gradual addition of the chloride with very gradual heating may also be used, but we prefer to place all of the chloride in solution before the temperature approaches the end point. Chloride addition and heating may be effected jointly, so long as the rate of inducing supersaturation is not too great.

It should be distinctly understood that we have chosen only a single set of data for the purpose of explaining this process. It should be obvious to one skilled in these matters that an infinite number of other starting liquors, comparisons, and examples exist in a system of this magnitude. Likewise, for purposes of simplification during exposition, we have considered all solutions to lie upon or to travel to fixed points or lines on Figure 1. In actual practice, such state of perfection is not at times reached and we do not wish to have the usefulness of our invention construed only within the narrow limits of the perfect examples offered in explanation of the principles. For example, while we prefer to avoid precipitation of monohydrate, a dynamic equilibrium system may be established in which sodium carbonate monohydrate is continuously precipitated to a limited extent with the burkeite while maintaining an appreciable degree of supersaturation of the carbonate. Liquors produced by that method are of improved quality, being low in sulphate and having a high carbonate to sulphate ratio while highly accurate control of the process to prevent such precipitation is unnecessary. Monohydrate so precipitated can be recovered by leaching these solids with cold sulphate liquor or other equivalent liquor unsaturated with carbonate monohydrate.

The sodium chloride concentration of the hot carbonate liquor may be established solely by addition of chloride before heating or some additional chloride can be added subsequently, as during the heating step. Sodium chloride possesses a relatively flat solubility curve and a liquor saturated with chloride at one temperature will often provide just about the desired (undersaturated) chloride concentration at a temperature 10-40° higher. In general, when using the process of this invention to its fullest extent, we strive to add sufficient sodium chloride to establish a supersaturation with respect to sodium carbonate monohydrate of from 5 to 7 grams $Na_2CO_3$, as referred to an equilibrium diagram such as Figure 1.

The hot carbonate liquor (R, in the example) after separation from precipitated burkeite contains an especially high ratio of carbonate to sulphate, and very little of the latter. In this condition, it may be cooled until it becomes saturated with respect to sodium carbonate decahydrate or heptahydrate. This cooling may, in certain instances, cause the precipitation of a small quantity of pure sodium chloride, which can be separated at this point, yielding a valuable commodity for commercial use, or for use in the sodium chloride saturation step. After the removal of sodium chloride, the solution may be additionally cooled, precipitating sal soda until the point of true saturation with Glauber salt is reached. A small amount of Glauber salt supersaturation may be tolerated in this step, as Glauber salt exhibits a relatively stable range of supersaturation over several degrees in this system. By such a process, a large yield of sodium carbonate is attainable. Due to the inevitable formation of mixed crystals between the decahydrates of sodium sulphate and carbonate, the precipitated sal soda will, of course, contain a small percentage of sulphate. However, due to the decreased sulphate content of the hot carbonate liquor of this invention, and also due to its higher carbonate content as compared with prior art practice, the present sal soda crop is not only of greater weight, but also of greater purity than in the past. It is susceptible to the same refining or conversion methods employed for transforming prior art sal soda into more commercially acceptable products but with less expenditure of energy and money.

The hot carbonate solution of the present invention, usually after slight dilution, may be used to precipitate sodium carbonate monohydrate by the addition of ammonia instead of the final cooling operation just specified. Likewise, the solution may be treated with carbon dioxide gas for the removal of the carbonate content thereof.

In the preferred process, we employ salt mixtures consisting of what are termed "salt trap" salts and "clarifier salts." The former contain about 60% sodium chloride, 20% sodium sulphate, and 10% sodium carbonate, while the latter contain about 40% sodium sulphate, 35% sodium carbonate, and 10% sodium chloride, the remainder in both cases being water and insoluble matter. The so-called "salt trap" salt comprises a mixture of common salt together with a sulphate-carbonate complex similar to burkeite. Clarifier salt contains a large proportion of the sulphate-carbonate complex together with small amounts of common salt and some sodium carbonate monohydrate. The presence of this monohydrate is very desirable in the final production of the hot carbonate liquor. It was instrumental, for example, in producing the liquor P of the foregoing examples.

In practice, the process of the present invention may be made a part of a cyclical process in which Glauber salt is first recovered from salt mixtures having a ratio of carbonate to sulphate not essentially greater than unity, and a solution termed cold sulphate liquor is obtained which may sometimes be beneficiated with respect to sodium carbonate by subsequent treatment before subjection to the steps of our invention. Various manipulations will produce such a liquor and we will describe our invention with an example using the liquor P previously referred to as having been chosen more or less as a hypothetical case selected for the purpose of explaining the process in its simplest concepts, which contains 19 grams $Na_2SO_4$ per 100 grams $H_2O$ and 31.85 grams $Na_2CO_3$ per 100 grams $H_2O$. To 1,000 pounds of this solution having the ideal composition:

| | Pounds |
|---|---|
| $Na_2CO_3$ | 211 |
| $Na_2SO_4$ | 126 |
| $H_2O$ | 663 | we add 168 pounds of NaCl while maintaining the temperature below that at which the solution can precipitate any sodium carbonate monohydrate. In this example, the latter temperature is about 30° C. We employ a temperature somewhat below this, say 25–30° C. This operation precipitates burkeite and causes the solution composition to move along the line P—R. If the retention time is long enough the solution will reach a point along the boundary of the burkeite field, such as W on the line VW, or a similar intersection on the burkeite boundary line of a slightly lower temperature system. Since burkeite is also precipitated in the following step, this step may be stopped short of equilibrium. The quantity of sodium chloride we have added is slightly in excess of that needed to saturate the solution at 25° C. to 30° C.

The resulting liquor is then gradually heated to a temperature at which it becomes supersaturated with sodium carbonate monohydrate to the extent of up to about 5–7 grams $Na_2CO_3$ per 100 grams $H_2O$. The exact temperature of heating is dependent upon the sulphate concentration which it is desired to produce and upon the sodium chloride concentration of the solution. The sulphate content of the liquor varies inversely with temperature, but too high a temperature lowers the carbonate content by precipitation of the $Na_2CO_3.H_2O$ held in supersaturation. Such operation may be chosen with a sodium chloride concentration at any point below saturation but above 50% of saturation. We prefer to operate with the sodium chloride concentration at least 75% of saturation. By saturation we mean to refer to that amount of chloride as would be held in solution at the invariant equilibrium point (at a fixed temperature) saturated with NaCl, $Na_2CO_3.H_2O$ and $Na_2CO_3.2Na_2SO_4$. The choice of the degree of unsaturation is directed to a large extent by the composition of the original liquor, as exemplified by P in this example. We have shown this liquor as traveling from P to R while adding a sodium chloride charge which would, under equilibrium conditions, correspond with point S, about 90% saturated with respect to NaCl. In certain instances, it may be permissible while establishing the desired 5 to 7 grams $Na_2CO_3$ supersaturation to add even greater quantities of NaCl. While we may, at times, add as much NaCl as will conveniently and readily dissolve, such quantity of chloride is always less than the equilibrium value recognized by the prior art. The final result of our mode of operation is a vastly different liquor, one high in sodium carbonate by virtue of a material degree of supersaturation with respect to sodium carbonate monohydrate.

In this case, the solution is heated to about 65° C., the excess or solid chloride dissolving. The heating operation causes the solution composition to proceed along the line P—R to some point R about 5–7 grams $Na_2CO_3$ per 100 grams $H_2O$ above the point S which would represent an equilibrium solution saturated with $Na_2CO_3.H_2O$ and burkeite and containing the quantity of NaCl supplied. At the point R the solution is essentially saturated with burkeite, supersaturated with sodium carbonate monohydrate, and somewhat undersaturated with sodium chloride.

This operation precipitates burkeite and produces a hot carbonate liquor of the following composition:

| | Pounds |
|---|---|
| $Na_2CO_3$ | 168 |
| $Na_2SO_4$ | 10.9 |
| NaCl | 168 |
| Water | 663 |

The total burkeite precipitated during the addition of chloride and heating weighs approximately 158 pounds, and is filtered off or otherwise separated from solution and may be used in other steps of the basic process. The hot carbonate liquor may then be further treated for the recovery of its sodium carbonate and sodium chloride contents, as for example by the procedures described in Patent No. 1,836,426.

In place of saturating the solution with pure sodium chloride, we have employed salt trap salt of the composition supra, using sufficient of this salt trap salt to supply the required 168 pounds of sodium chloride. Also, the so-called clarifier salt may be utilized for its NaCl content with advantages named in the aforesaid patent. Other variations of the primary steps of this process of producing hot carbonate liquor which are set forth in that patent likewise may be practised with the new steps of our invention.

While the particular processes herein described are well adapted to carry out the objects of the present invention, it is to be understood that various modifications and changes may be made without departing from the principles of the invention, and the invention includes all such modifications and changes as come within the scope of the appended claims.

We claim:

1. A process of increasing the sodium carbonate to sodium sulphate ratio of solutions containing a greater ratio of sodium carbonate to sodium sulphate than that of burkeite and containing sufficient sodium carbonate and sodium sulphate that substantial amounts of both burkeite and sodium carbonate monohydrate will be precipitated upon saturation with sodium chloride at temperatures within the burkeite range, which process comprises, precipitating burkeite from said solution at a temperature within said range sufficiently high to cause substantial precipitation of said monohydrate if sufficient sodium chloride were present to saturate said solution with sodium chloride at said temperature, said precipitating being carried out in the presence of sufficient sodium chloride to produce at least saturation of said solution with said monohydrate but insufficient to cause precipitation of said monohydrate, the amount of sodium chloride in said solution at said temperature being substantially less than that required to saturate said solution with sodium chloride at said temperature.

2. A process of increasing the sodium carbonate to sodium sulphate ratio of solutions containing a greater ratio of sodium carbonate to sodium sulphate than that of burkeite and containing sufficient sodium carbonate and sodium sulphate that substantial amounts of both burkeite and sodium carbonate monohydrate will be precipitated upon saturation with sodium chloride at temperatures within the burkeite range, which process comprises, precipitating burkeite from said solution at a temperature within said range substantially above that at which monohydrate will begin to precipitate if said solution were maintained saturated with sodium chloride, said precipitating being carried out in the presence of sufficient sodium chloride to produce at least saturation of said solution with said monohydrate but insufficient to cause precipitation of said monohydrate, the amount of sodium chloride in said solution at said temperature being substantially less than that required to saturate said solution with sodium chloride at said temperature.

3. A process of increasing the sodium carbonate to sodium sulphate ratio of solutions containing a greater ratio of sodium carbonate to sodium sulphate to that of burkeite and containing at least 17 grams of sodium carbonate per 100 grams of water and sufficient sodium sulphate that substantial amounts of both burkeite and sodium carbonate monohydrate will be precipitated upon saturation with sodium chloride at temperatures within the burkeite range, which process comprises, precipitating burkeite from said solution at a temperature within said range sufficiently high to cause substantial precipitation of said monohydrate if sufficient sodium chloride were present to saturate said solution with sodium chloride at said temperature, said precipitating being carried out in the presence of sufficient sodium chloride to produce at least saturation of said solution with said monohydrate but insufficient to cause precipitation of said monohydrate, the amount of sodium chloride in said solution at said temperature being substantially less than that required to saturate said solution with sodium chloride at said temperature.

4. A process of increasing the sodium carbonate to sodium sulphate ratio of solutions containing a greater ratio of sodium carbonate to sodium sulphate than that of burkeite and containing sufficient sodium carbonate and sodium sulphate that substantial amounts of both burkeite and sodium carbonate monohydrate will be precipitated upon saturation with sodium chloride at temperatures within the burkeite range, which process comprises, precipitating burkeite from said solution at a temperature within said range sufficiently high to cause substantial precipitation of said monohydrate if sufficient sodium chloride were present to saturate said solution with sodium chloride at said temperature, said precipitating being carried out in the presence of sufficient sodium chloride to produce substantial super-saturation of said solution with said monohydrate but insufficient to cause precipitation of said monohydrate, the amount of sodium chloride in said solution at said temperature being substantially less than that required to saturate said solution at said temperature.

5. A process of increasing the sodium carbonate to sodium sulphate ratio of solutions containing a greater ratio of sodium carbonate to sodium sulphate than that of burkeite such that amounts of both burkeite and sodium carbonate monohydrate will be precipitated upon saturation with sodium chloride at temperatures within the burkeite range, which process comprises, adding a predetermined amount of sodium chloride to said solution while said solution is at a temperature below that at which sodium carbonate monohydrate precipitates upon saturation with sodium chloride at said temperature, and precipitating burkeite from said solution by heating the same to a temperature which would cause precipitation of substantial amounts of sodium carbonate monohydrate if said solution were saturated with sodium chloride at said last mentioned temperature, said predetermined amount of sodium chloride being insufficient to cause precipitation of said sodium carbonate monohydrate at said last mentioned temperature but sufficient to produce at least saturation of said solution with sodium carbonate monohydrate at said last mentioned temperature, the amount of sodium chloride in said solution at said last mentioned temperature being substantially less than that required to saturate said solution with sodium chloride at said last mentioned temperature.

6. A process of increasing the sodium carbonate to sodium sulphate ratio of solutions containing a greater ratio of sodium carbonate to sodium sulphate than that of burkeite and containing sufficient sodium carbonate and sodium sulphate that substantial amounts of both burkeite and sodium carbonate monohydrate will be precipitated upon saturation with sodium chloride at temperatures within the burkeite range, which process comprises, saturating said solution with sodium chloride to precipitate burkeite while said solution is at a temperature which will produce saturation of the solution with sodium carbonate monohydrate without precipitation of said monohydrate, and heating said solution without the addition of further sodium chloride to a temperature between 50 and 90° C. and sufficient to produce substantial further precipitation of burkeite without causing precipitation of said monohydrate, whereby said solution is unsaturated with sodium chloride at said last mentioned temperature, the amount of sodium chloride in said solution at said last mentioned temperature being substantially less than that required to saturate said solution with sodium chloride at said last mentioned temperature.

LEROY G. BLACK.
ELLIOTT BRYANT FITCH.
HENRY BRUNO SUHR.